(No Model.)

W. E. HILL.
COMBINED BORING AND REAMING TOOL.

No. 312,350. Patented Feb. 17, 1885.

Attest.
Jno. C. Perkins
Charles V. Chase

Inventor.
William E. Hill
By Lucius C. West
Atty

United States Patent Office.

WILLIAM E. HILL, OF KALAMAZOO, MICHIGAN.

COMBINED BORING AND REAMING TOOL.

SPECIFICATION forming part of Letters Patent No. 312,350, dated February 17, 1885.

Application filed February 28, 1884. (No model.)

*To all whom it may concern:*

Be it known that I, WILLIAM E. HILL, a citizen of the United States, residing at Kalamazoo, county of Kalamazoo, State of Michigan, have invented a new and useful Combined Pipe Auger and Reamer, of which the following is a specification.

The object of my invention is to construct a combined pipe auger and reamer, whereby certain useful results are effected in dressing the inner surface of a pipe or tubing. A general construction of my device consists in a circular head provided with cutting-points and with reamers, which form a bearing to the auger-head and its axle-shaft in the pipe being operated upon.

Figure 1:
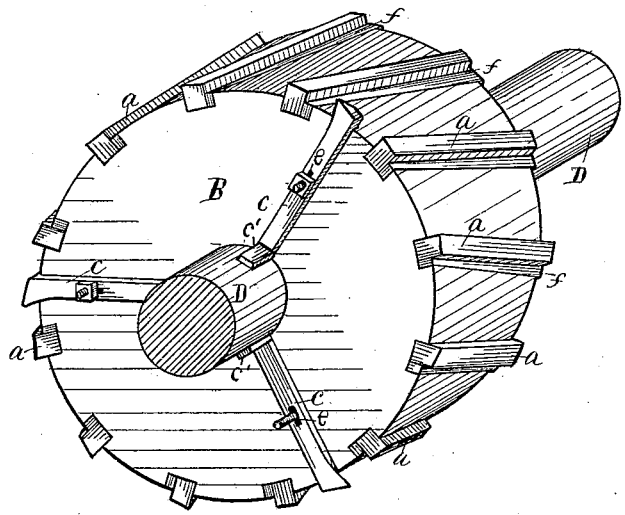
Figure 2:
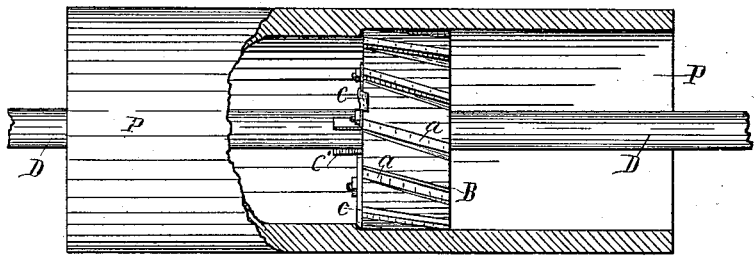

In the drawings forming a part of this specification, Figure 1 is an end perspective view; Fig. 2, a side elevation showing the device in a pipe and illustrating the operation, and Fig. 3 is an end view showing a change in construction from Fig. 1.

D is a revoluble axle-shaft, to which the head B is secured. To the forward end of this head are secured bars $c\ c$, which terminate in cutting-points beyond the periphery of the head. Said bars $c\ c$ are located in radial grooves, and are secured to the head by bolts through the elongated slot $e$. A wedge, $c'$, is located between shaft D and the end of the bar $c$ next to it, by means of which and the slot $e$ the cutting-points are adjusted to cut deep or shallow.

Figure 3:
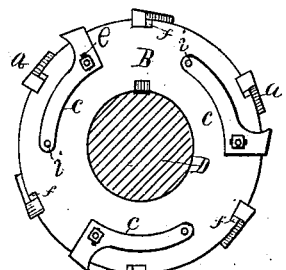

In Fig. 3 the bar $c$ is elbowed and pivoted at $i$. This equivalent plan is adopted when the head B is so small that there is not sufficient distance between the shaft D and the periphery of the head in which to locate a straight bar, $c$, of a length to be sufficiently strong and conveniently operated. The reamers $a\ a$ are located in grooves diagonally across the periphery of the head B, at a suitable distance apart. They engage the surface of the pipe on the principle of a shear, removing the shavings cut by the cutting-points of bars $c\ c$ and carrying them to the rear of the head B. Said reamers also polish the bored surface of the pipe and form a bearing-surface to the head. Thus no other bearings are needed at this end of the shaft, for which reason a pipe, P, may pass over the head B without conflicting with or necessitating the removal of any bearing-support to the axle-shaft D. The reamers $a\ a$ are held in the grooves by wedges $f\ f$, driven in at the side. Thus the reamers may be readily detached when worn and new ones supplied in their places.

A device may be made on the same principle for dressing the outer surface of a pipe or round shaft by securing the cutting-points and the reamers on the inner surface of a tubular head.

Having thus described my invention, what I claim is—

1. A combined pipe auger and reamer consisting of a revoluble shaft and head provided on the periphery of said head with cutting-points for boring a pipe, and with reamer-bars for reaming said pipe, all substantially as set forth.

2. The head provided with radial bars terminating in cutting-points, and adjustably secured to said head, and with diagonal reamers, substantially as described.

In testimony of the foregoing I have hereunto subscribed my name in the presence of two witnesses.

WILLIAM E. HILL.

Witnesses:
DUMONT A. SHEPARDSON,
HORACE DENISON.